(12) United States Patent
Yang

(10) Patent No.: US 10,816,859 B1
(45) Date of Patent: Oct. 27, 2020

(54) DISPLAY PANEL, MANUFACTURING METHOD AND DISPLAY APPARATUS

(71) Applicant: HKC CORPORATION LIMITED, Shenzhen (CN)

(72) Inventor: Chunhui Yang, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 57 days.

(21) Appl. No.: 16/349,282

(22) PCT Filed: Nov. 21, 2018

(86) PCT No.: PCT/CN2018/116618
§ 371 (c)(1),
(2) Date: May 13, 2019

(87) PCT Pub. No.: WO2020/097959
PCT Pub. Date: May 22, 2020

(30) Foreign Application Priority Data

Nov. 14, 2018 (CN) .......................... 2018 1 1350598

(51) Int. Cl.
G02F 1/1343 (2006.01)

(52) U.S. Cl.
CPC .................. *G02F 1/134309* (2013.01); *G02F 2001/134318* (2013.01); *G02F 2001/134372* (2013.01); *G02F 2001/134381* (2013.01)

(58) Field of Classification Search
CPC ... G02F 1/134309; G02F 2001/134381; G02F 2001/134372; G02F 2001/134318
See application file for complete search history.

(56) References Cited

U.S. PATENT DOCUMENTS

2016/0187735 A1* 6/2016 Xi ..................... G02F 1/134309
349/139

* cited by examiner

*Primary Examiner* — Phu Vu

(57) ABSTRACT

The present application discloses a display panel, a manufacturing method and a display apparatus. First common lines and first electrodes are disposed on a first substrate; an overlapped shading zone and a photic zone are provided between each of the first electrodes and each of the first common lines; each of the photic zones includes an edge photic zone; and a film thickness of each of the edge photic zones is greater than a film thickness of each of the overlapped shading zones.

19 Claims, 7 Drawing Sheets

DISPLAY PANEL, MANUFACTURING METHOD AND DISPLAY APPARATUS

The present application claims priority to the Chinese Patent Application No. CN201811350598.1, filed with the Chinese Patent Office on Nov. 14, 2018, and entitled "DISPLAY PANEL, MANUFACTURING METHOD AND DISPLAY APPARATUS", which is incorporated herein by reference in its entirety.

TECHNICAL FIELD

The present application relates to the technical field of display, and in particular to a display panel, a manufacturing method and a display apparatus.

BACKGROUND

The statements in this section merely provide background information related to the present application and may not constitute prior art.

Along with the development and progress of science and technology, a flat-panel display has become a mainstream display product and is widely applied because of hot points such as a thin body, power saving and low radiation. The flat-panel displays include a Thin Film Transistor-Liquid Crystal Display (TFT-LCD) and an Organic Light-Emitting Diode (OLED) display, etc. Among them, the TFT-LCD refracts light rays of a backlight module by controlling rotation direction of liquid crystal molecules to generate a picture and thus has numerous advantages such as a thin body, power saving and no radiation. However, the OLED display is made of an OLED and has many advantages such as self-illumination, short response time, high definition and contrast ratio, and capability of implementing flexible display and large-area full-color display.

For a Multi-domain Vertical Alignment (VA) panel, a common polymer stable vertical alignment type is of a non-contact alignment manufacturing process, so problems of static electricity, ion contamination and the like due to contact friction alignment may be prevented. However, there is still a need for further improvement on a dark line for a polymer vertical alignment technology.

SUMMARY

An object of the present application is to provide a display panel, a manufacturing method and a display apparatus to eliminate a boundary of a pixel dark line.

To this end, the present application provides a display panel, which includes: a first substrate; and a second substrate disposed in a cell aligned manner with the first substrate; first common lines and first electrodes are disposed on the first substrate; each of the first electrodes is partially overlapped with each of the first common lines; a common electrode corresponding to the first common lines and the first electrodes is disposed on the second substrate; each of portions where the first electrodes and the first common lines are overlapped is an overlapped shading zone; each of portions where the first electrodes and the first common lines are not overlapped is a photic zone; each of the photic zones includes: a main photic zone; and an edge photic zone, disposed between each of the main photic zones and each of the overlapped shading zones and close to each of the overlapped shading zones; and a film thickness of each of the edge photic zones is greater than a film thickness of each of the overlapped shading zones.

Optionally, the film thickness of each of the edge photic zones is greater than a film thickness of each of the main photic zones.

Optionally, the film thickness of the each of the main photic zones is equal to the film thickness of each of the overlapped shading zones.

Optionally, the film thickness of each of the main photic zones is greater than the film thickness of each of the overlapped shading zones.

Optionally, the film thickness of each of the edge photic zones is not greater than ten times of the film thickness of each of the main photic zones.

Optionally, a width of each of the edge photic zones is greater than 0.01 times of a width of each of the first electrodes, and is smaller than a half of the width of each of the first electrodes.

Optionally, the film thickness of each of the overlapped shading zones is greater than one tenth of the film thickness of each of the main photic zones.

Optionally, the film thickness of each of the main photic zones on the first substrate is equal to a film thickness of the common electrode on the second substrate. The present application further discloses a manufacturing method, which includes a manufacturing method of a first substrate; and the manufacturing method of the first substrate includes the following steps: depositing a metal layer on a base, and etching to obtain first common lines each with a preset pattern; forming an insulating layer on each of the first common lines, and depositing a pixel electrode material on the insulating layers; depositing a photoresist material on the pixel electrode material; forming a photoresist layer with a preset pattern by exposure and image developing; performing the exposure and the image developing once by using a semi-transparent film mask or performing the exposure and the image developing for multiple times by using a plurality of masks to treat the pixel electrode material to obtain first electrodes of which a film thickness of each of edge photic zones is greater than a film thickness of each of overlapped shading zones; and stripping the photoresist layer.

The present application further discloses a display apparatus, which includes the above-mentioned display panel.

In a VA-mode display panel, since each of the first common lines is connected with the common electrode, there is no voltage difference there between; the first common lines are not photic, so each of portions where the first common lines are overlapped with a pixel electrode is not photic; an edge electric field is formed between the pixel electrode and the common electrode as well as between the pixel electrode and each of the first common lines; the edge electric fields will affect light-dark uniformity of an edge zone portion of each of the first common lines, which is referred to as an edge field effect; the edge field effect affects the stability of the electric field between the pixel electrode and the common electrode; once the electric field is fluctuated, deflection angles of a part of liquid crystals are fluctuated and thus problems of light-dark non-uniformity including the dark line, and an unclear light-dark boundary are occurred; for the dark line, on the basis of this, when each of the first electrodes is manufactured, the dark line is improved by setting different film thicknesses; specifically, the film thickness of each of the edge photic zones is greater than the film thickness of each of the overlapped shading zones; and by increasing the film thickness of each of the edge photic zones, a deflecting electric field between each of the edge photic zones and the common electrode is increased. In this way, in an edge zone of each of the first common lines, i.e., the edge photic zones, although the deflecting electric field between the pixel electrode and the common electrode is still affected by the edge electric fields, an intensity of the deflecting electric field is far greater than an intensity of each of the edge electric fields. As the relative intensity of the deflecting electric field in each of the main photic zones is increased, the stability of the deflecting electric fields is improved, the influence of the edge electric fields is reduced, and thus the occurrence of problems such as the dark line or non-uniform lightness in the edge zone of each of the first common lines is reduced.

BRIEF DESCRIPTION OF DRAWINGS

The drawings are included to provide further understanding of embodiments of the present application, which constitute a part of the specification and illustrate the embodiments of the present application, and describe the principles of the present application together with the text description. Apparently, the accompanying drawings in the following description show merely some embodiments of the present application, and a person of ordinary skill in the art may still derive other accompanying drawings from these accompanying drawings without creative efforts. In the accompanying drawings.

DETAILED DESCRIPTION

Figure 1:
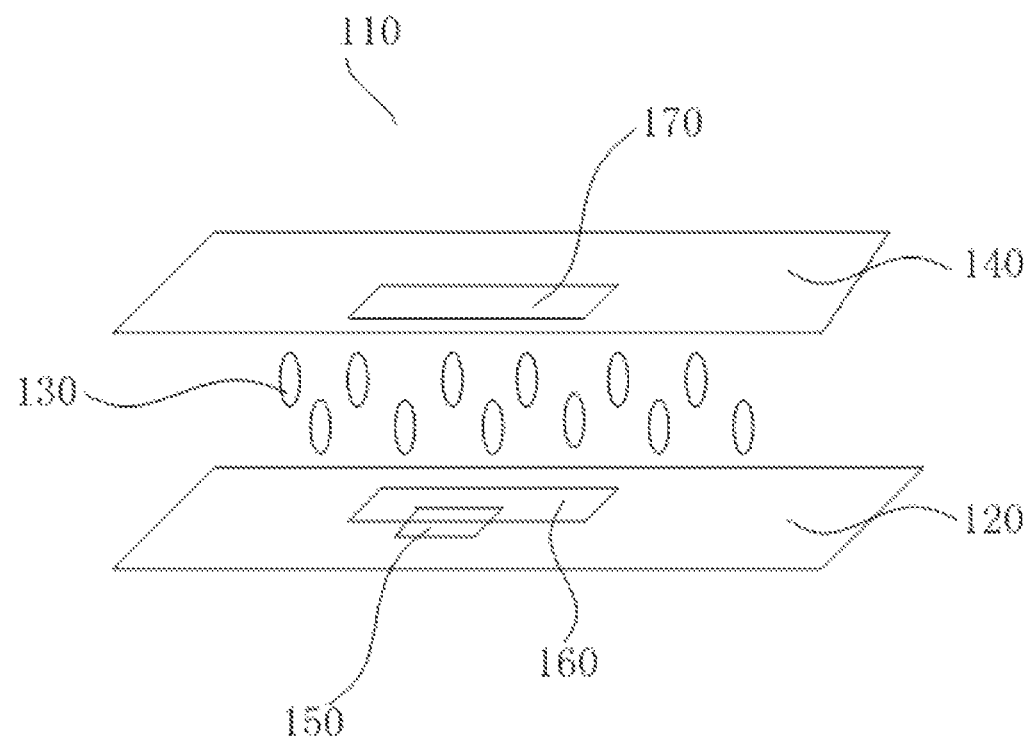
FIG. 1 is a schematic diagram of a display panel according to an embodiment of the present application.

The specific structure and function details disclosed herein are merely representative, and are intended to describe exemplary embodiments of the present application. However, the present application can be specifically embodied in many alternative forms, and should not be interpreted to be limited to the embodiments described herein.

In the description of the present application, it should be understood that, orientation or position relationships indicated by the tens "center", "transversal", "upper", "lower", "left". "right", "vertical", "horizontal", "top", "bottom", "inner", "outer", etc. are based on the orientation or position relationships as shown in the drawings, for ease of the description of the present application and simplifying the description only, rather than indicating or implying that the indicated device or element must have a particular orientation or be constructed and operated in a particular orientation. Therefore, these terms should not be understood as a limitation to the present application. In addition, the terms such as "first" and "second" are merely for a descriptive purpose, and cannot be understood as indicating or implying a relative importance, or implicitly indicating the number of the indicated technical features. Hence, the features defined by "first" and "second" can explicitly or implicitly include one or more features. In the description of the present application, "a plurality of" means two or more, unless otherwise stated. In addition, the term "include" and any variations thereof are intended to cover a non-exclusive inclusion. In the description of the present application, it should be understood that, unless otherwise specified and defied, the terms "install", "connected with", "connected to" should be comprehended in a broad sense. For example, these terms may be comprehended as being fixedly connected, detachably connected or integrally connected; mechanically connected or coupled; or directly connected or indirectly connected through an intermediate medium, or in an internal communication between two elements. The specific meanings about the foregoing terms in the present application may be understood by those skilled in the art according to specific circumstances.

The terms used herein are merely for the purpose of describing the specific embodiments, and are not intended to limit the exemplary embodiments. As used herein, the singular forms "a", "an" are intended to include the plural forms as well, unless otherwise indicated in the context clearly. It will be further understood that the terms "comprise" and/or "include" used herein specify the presence of the stated features, integers, steps, operations, elements and/or components, but do not preclude the presence or addition of one or more other features, integers, steps, operations, elements, components and/or combinations thereof.

The present application will be further described below in combination with the accompanying drawings and optional embodiments.

As shown in FIG. 1, an embodiment of the present application discloses a display panel 110, which includes: a first substrate 120; a second substrate 140, disposed in a cell aligned manner with the first substrate 120; and liquid crystal layers 130, clamped between the first substrate 120 and the second substrate 140; first common lines 150 as well as first electrodes 160 partially overlapped with the first common lines 150 are disposed on the first substrate (Array) 120; a common electrode 170 corresponding to the first common lines and the first electrodes is disposed on the second substrate 140; an insulating layer (PVX) is disposed between each of the first common lines and each of the first electrodes; and each of the insulating layers covers each of the first common lines.

Figure 3:
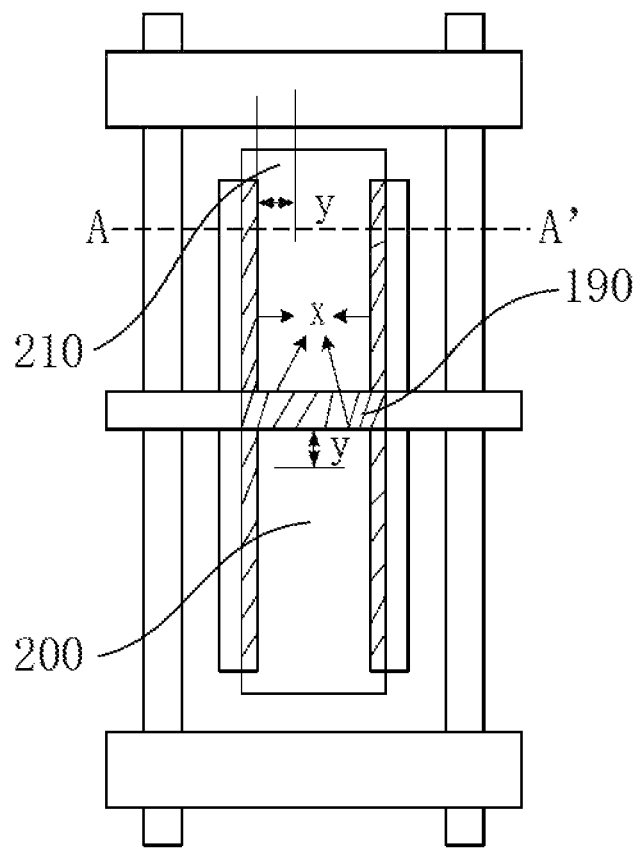
FIG. 3 is a schematic diagram of an edge photic zone according to an embodiment of the present application.
Figure 5:
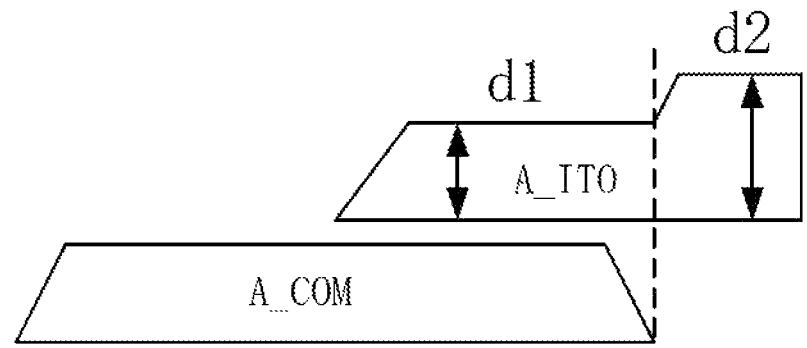
FIG. 5 is a schematic diagram showing that a film thickness of an edge photic zone is greater than a film thickness of an overlapped shading zone according to an embodiment of the present application.

As shown in FIG. 3, a portion where each of the first electrodes and each of the first common lines are overlapped is an overlapped shading zone 190; a portion where each of the first electrodes and each of the first common lines are not overlapped is a photic zone, and each of the photic zones includes an edge photic zone 210 close to each of the overlapped shading zones 190. As shown in FIG. 5, a film thickness of each of the edge photic zones 210 is greater than a film thickness of each of the overlapped shading zones 190.

Figure 4:
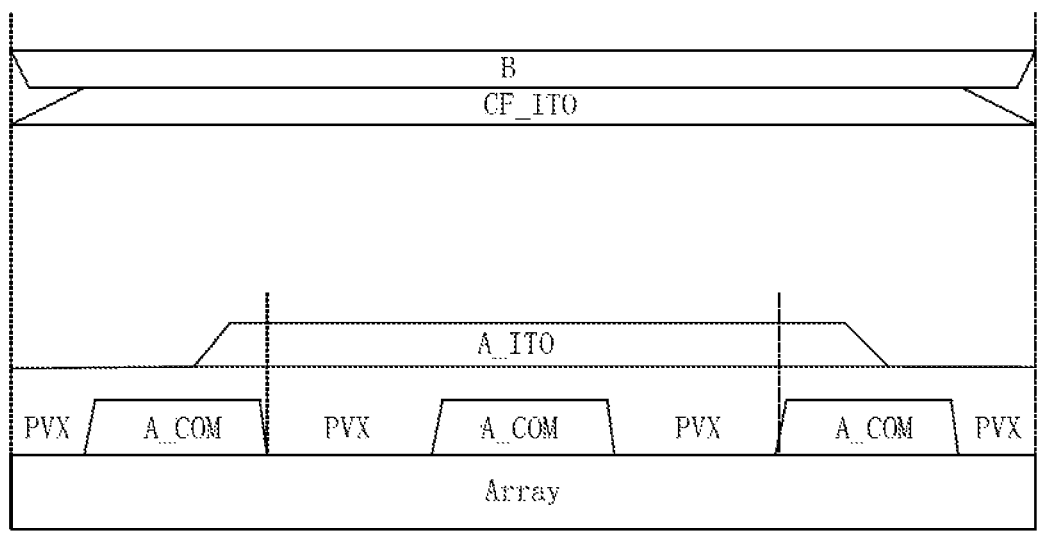
FIG. 4 is a schematic diagram of an AA' section in FIG. 3 according to an embodiment of the present application.

In a VA-mode display panel 110, since each of the first common lines is connected with the common electrode, there is no voltage difference there between. The first common lines are not photic, so each of portions where the first common lines and the common electrode are overlapped is not photic. As shown in FIG. 4, a pixel electrode (Array Indium tin oxide, A_ITO) is disposed on the first common lines, the pixel electrode and the common electrode are formed into a pixel capacitor, and the pixel electrode and the common electrode are formed into a deflecting electric field, thereby controlling deflection of liquid crystals; and meanwhile, the pixel electrode is partially overlapped with each of the first common lines to form a storage capacitor. Where, an edge electric field is formed between the pixel electrode and the common electrode as well as between the pixel electrode and each of the first common lines; the edge electric fields will affect the light-dark uniformity of edge zone portions of the first common lines, which is referred to as an edge field effect; the edge field effect affects the stability of the electric field between the pixel electrode and the common electrode; once the electric field is fluctuated, deflection angles of a part of liquid crystals are fluctuated and thus problems of light-dark non-uniformity including the dark line, and an unclear light-dark boundary are occurred.

Figure 2:
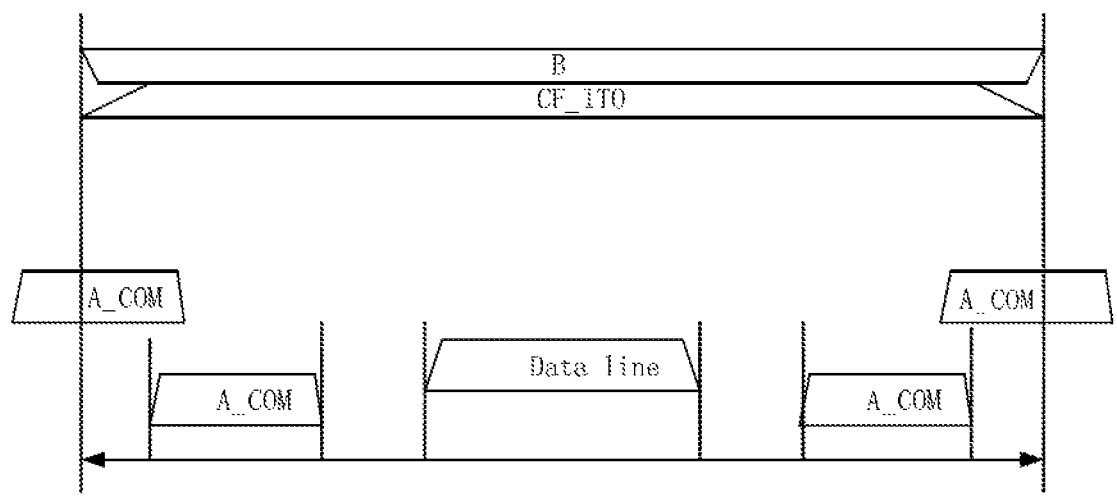
FIG. 2 is a schematic diagram of a metal shielding method according to an embodiment of the present application.

In this solution, common metal lines on an array substrate (Array commons, A_COMs) are the first common lines, and a common electrode on a color-film substrate (Color Film Indium tin oxide, CF_ITO) is overlaid generally by using the A_COMs and the pixel electrode for the dark line as shown in FIG. 2; then, each of the A_COMs shares a voltage with the CF_ITO and thus both are potential to form electric field shielding, thereby achieving the purpose that liquid crystals at the periphery of a pattern of the pixel electrode in a pixel are guided stably and regularly. A line potential of each of the A_COMs is equal to a line potential of the CF_ITO, so there is no voltage difference there between, liquid crystals there between are not rotated, and a dark state is shown; electric fields of each of the A_COMs and the CF_ITO are affected to each other, but such an influence turns out to be small. FIG. 2 is a sectional view of a pixel data line. It may be seen that a vertical space between pixel electrode on the array substrate (Array Indium tin oxide, A_ITO) and each of A_COMs is overlaid. i.e., an A_COM shielding method commonly used at present; and therefore, the A_COM shielding method is also referred to as a shielding metal, abbreviated as SM. However, for the A_COM shielding method, a boundary between a light zone at an edge of each of the A_COMs and a dark zone shielded by each of the A_COMs is not obvious, which directly results in that a boundary of the pixel dark line is vague and thus the penetration rate is reduced and the contrast ratio is reduced.

In this solution, on the basis of the above description, when each of the first electrodes is manufactured, the dark line is improved by setting different film thicknesses. Specifically, as shown in FIG. 3 and FIG. 5, a film thickness d2 of each of the edge photic zones 210 is greater than a film thickness d1 of each of the overlapped shading zones 190; and by increasing the film thickness of each of the edge photic zones 210, a deflecting electric field between each of the edge photic zones 210 and the common electrode is increased. In this way, in the edge zone of each of the first common lines, i.e., the edge photic zones 210, although the deflecting electric field between the pixel electrode and the common electrode is still affected by edge electric fields, an intensity of the deflecting electric field is far greater than an intensity of each of the edge electric fields. As the relative intensity of the deflecting electric field in each of the main photic zones 200 is increased, the stability of the deflecting electric fields is improved, the influence of the edge electric fields is reduced, and thus the occurrence of problems such as the dark line or non-uniform lightness in the edge zones of the first common lines is reduced. Specifically, if the film thickness of the edge photic zone 210 of each of the first electrodes is increased, a relative distance between each of the first electrodes and the common electrode is reduced. It may be known from a formula of an electric field intensity E=U/d (this is a formula of a uniform electric field, an electric field between each of the first electrodes A_ITOs and the common electrode CF_ITO may be approximate to the uniform electric field, the U is a potential difference between each of the A_ITOs and the CF_ITO, the d is a vertical distance between each of the A_ITOs and the CF_ITO and the E is an electric field intensity) that if the electric field between each of the edge photic zones 210 and the common electrode is increased, each of the edge photic zones 210 is less affected by the edge electric field of each of the overlapped zones; and in this way, the edge field effect in display is reduced, and thus the condition of the pixel boundary dark line is improved, the penetration rate is improved, the contrast ratio is increased, and the quality and the display effect of a product are improved. In one or more embodiments, as shown in FIG. 3, each of the photic zones further includes a main photic zone 200; each of the edge photic zones 210 is disposed between each of the main photic zones 200 and each of the overlapped shading zones 190; and as shown in FIG. 5, the film thickness d2 of each of the edge photic zones 210 is greater than a film thickness d3 of each of the main photic zones 200.

In this solution, the film thickness of each of the main photic zones 200 is a film thickness of the pixel electrode designed for the panel. If the film thickness of the edge photic zone 210 of each of the first electrodes is increased, the relative distance between the first electrode and the common electrode in this zone is reduced. It is known from the formula of the electric field intensity E=U/d that if the electric field between each of the edge photic zones 210 and the common electrode is increased, the electric field intensity in this area is called as E1, and the electric field intensity between the first electrode and the common electrode in a zone of each of the main photic zones 200 is called as E2. As the film thickness of each of the edge photic zones 210 is greater than the film thickness of each of the main photic zones 200 that are designed normally, E1>E2, the E1 is stronger than a deflecting electric field under a normal condition and the anti-interference capability is stronger. Consequently, each of the edge photic zones 210 may resist the influence of the edge electric field of each of the overlapped shading zones 190, and the edge field effect is weakened, and thus the condition of the pixel boundary dark line is improved, the penetration rate is improved, the contrast ratio is increased, and the quality and the display effect of the product are improved. Where, since the film thickness of each of the edge photic zones 210 is greater than the film thickness of each of the main photic zones 200, by increasing a manufacture procedure or adopting a semi-transparent film mask in original manufacture procedures, a light transmittance of each of the edge photic zones 210 is different from a light transmittance of each of the main photic zones 200; and the effect that the film thickness of each of the edge photic zones 210 is greater than the film thickness of each of the main photic zones 200 at different moments is implemented.

Figure 6:
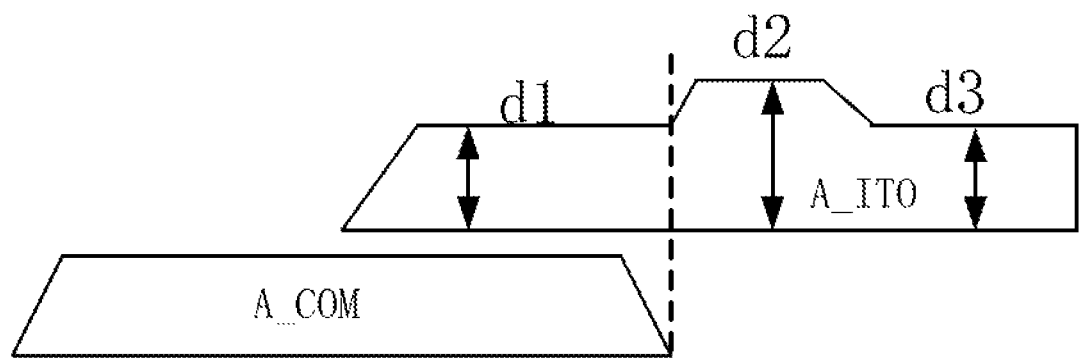
FIG. 6 is a schematic diagram showing that a film thickness of an overlapped shading zone is equal to a film thickness of a main photic zone according to an embodiment of the present application.

In one or more embodiments, as shown in FIG. 6, the film thickness d3 of each of the main photic zones 200 is equal to the film thickness d1 of each of the overlapped shading zones 190.

Figure 7:
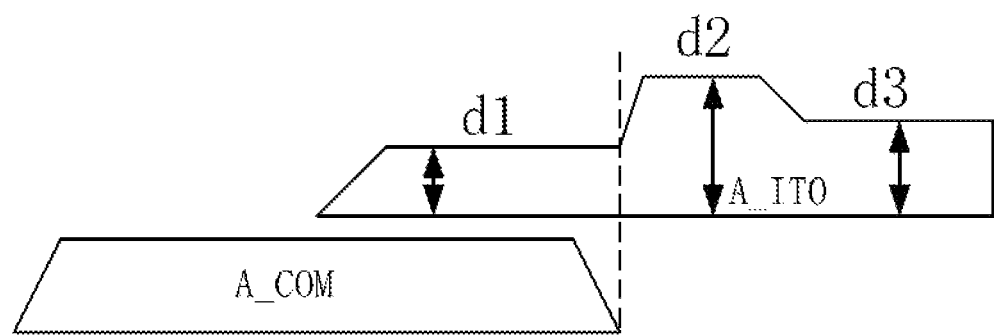
FIG. 7 is a schematic diagram showing that a film thickness of an overlapped shading zone is smaller than a film thickness of a main photic zone according to an embodiment of the present application.

In this solution, as shown in FIG. 7, in a zone where the pixel electrode and each of the first common lines are overlapped, the film thickness of the overlapped shading zone 190 and the film thickness of the main photic zone 200 are equal and are smaller than the film thickness of the edge photic zone 210. In this way, a deflecting voltage intensity of each of the edge photic zones 210 is stronger than the influence brought by the edge field effect, so that the problem that the light-dark non-uniformity including the boundary dark line is occurred by a display pattern is reduced, or even the boundary dark line may be eliminated. In addition, As the film thickness of each of the overlapped shading zones 190 is equal to the film thickness of each of the main photic zones 200, the purposes of reducing the dark line and improving the display effect can be achieved as long as the film thickness of each of the edge photic zones 210 is guaranteed to be increased during the manufacture procedures; and an original design thickness of each of the overlapped shading zones 190 and the main photic zones 200 may be kept (or is formed in a same manufacture procedure). Therefore, while the technical problem is solved, there is no need to design a special mask for each of the overlapped shading zones 190 and the main photic zones 200 so that the film thickness of each of the overlapped shading zones 190 is different from the film thickness of each of the main photic zones 200; the extra workload is reduced; and the difficulty of the manufacture procedures is lowered.

In one or more embodiments, as shown in FIG. 7, the film thickness d3 of each of the main photic zones 200 is greater than the film thickness d1 of each of the overlapped shading zones 190.

In this solution, the common lines are disposed below the pixel electrode generally, and the pixel electrode is disposed between the common electrode and the first common lines. By reducing the film thickness of each of the overlapped shading zones 190, the electric field intensity between each of the overlapped shading zones 190 of the pixel electrode and the common electrode is weakened, and the influence of the edge field effect on each of the edge photic zones 210 is weakened; while the thickness of each of the edge photic zones 210 is increased and the anti-interference capacity is enhanced, an intensity of a main electric field interference source is weakened, so the influence of the edge field effect is eliminated basically, the effect of better improving the light-dark non-uniformity is achieved, the problem of the dark line is eliminated basically, and the display quality of the display panel 110 is better improved.

In one or more embodiments, the film thickness of each of the edge photic zones 210 is smaller than ten times of the film thickness of each of the main photic zones 200.

Figure 9:
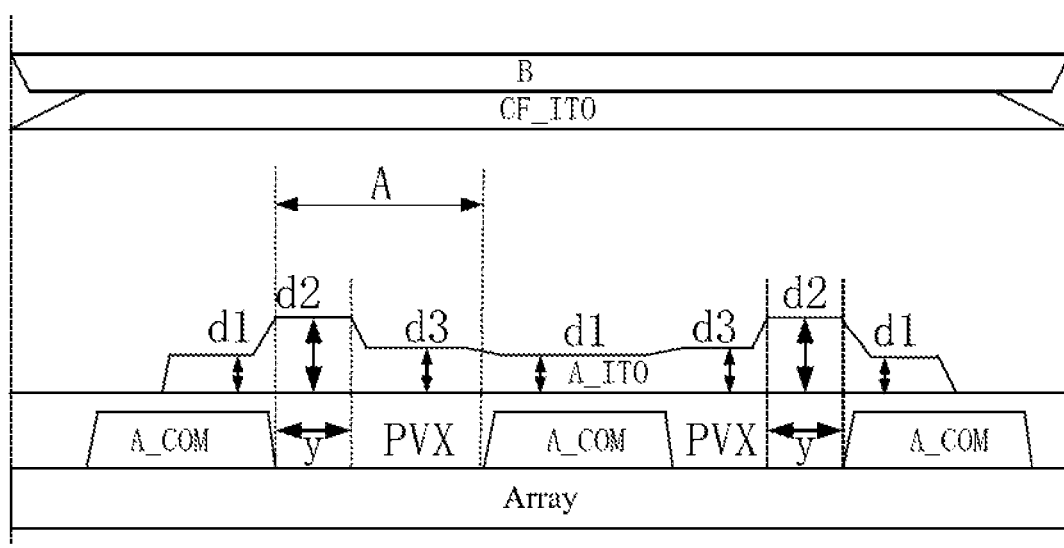
FIG. 9 is a schematic diagram of a pixel electrode according to an embodiment of the present application.

In this solution, the film thickness refers to a film thickness in a direction where each of the first electrodes is perpendicular to an electric field. As shown in FIG. 9, the film thickness of each of the edge photic zones 210 is d2 (a zone affected by the edge field effect), and the film thickness of each of the main photic zones 200 is d3 (a film thickness preset by the manufacture procedures of the display panel 110), i.e., the film thickness of each of the edge photic zones 210 is required as follows: d3<d2<10d3. In this way, the problem of the edge field effect may be improved or even is eliminated. Specifically, the larger the d2, the better the effect for eliminating the edge field effect. However, with a view to different designs of the display panels 110, for some panels, the distance between the pixel electrode and the common electrode is closer, and the problem of the edge field effect may be improved by setting the d2 to be greater than the d3. When the distance between the pixel electrode and the common electrode is enough, it may be appropriate to design the d2 to be close to ten times of the d3, thereby achieving the effect of better eliminating the edge field effect. However, the d2 is not greater than ten times of the d3 generally so as to prevent the problems that the film thickness of each of the edge photic zones 210 is too large and each of the first electrodes is too close to the common electrode to affect settings of liquid crystals, etc. Herein, the film thickness of the pixel electrode is 200 nm-2000 nm generally.

Figure 8:
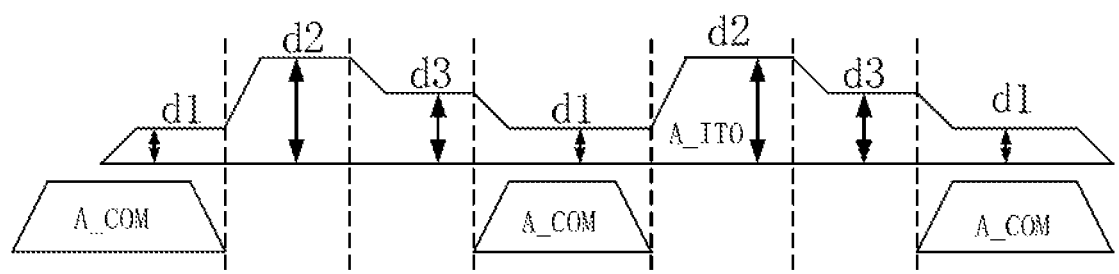
FIG. 8 is a schematic diagram of an improved AA' section according to an embodiment of the present application.

In one or more embodiments, as shown in FIG. 8, a width of each of the edge photic zones 210 is greater than zero and is smaller than a half of a width of each of the first electrodes. The width of each of the edge photic zones is y, 0<y<0.5 A. where the A is the width of each of the first electrodes, and generally, the y is equal to ⅓ A to achieve the best effect.

In this solution, each of the photic zones is divided into the edge photic zone 210 and the main photic zone 200; each of the edge photic zones 210 is located in each of the overlapped shading zones 190 or is a zone between an overlapped zone of each of the first electrodes and each of the first common lines, and each of the main photic zones 200. The areas are affected by the edge electric fields between the first electrodes and the first common lines, so if each of the areas is closer to an edge of each of the first common lines, the problems such as the dark line are occurred more easily. Herein, by increasing the film thickness of each of the edge photic zones 210, a voltage between each of the edge photic zones 210 and the common electrode may be strengthened, the influence of the edge electric fields is reduced and the problem of the dark line is improved. By recording the width of each of the first electrodes as A, since each of the first electrodes is further designed with the main photic zone 200, a maximal design width of each of the edge photic zones 210 is smaller than 0.5 A so as to ensure that there is a space for providing each of the main photic zones 200. In one or more embodiments, the film thickness of each of the overlapped shading zones 190 is greater than one tenth of the film thickness of each of the main photic zones 200.

In this solution, the film thickness of each of the overlapped shading zones 190 is smaller than the film thickness of each of the main photic zones 200, so the edge electric fields between the overlapped shading zones 190 and the first common lines can be weakened, and the influence of the edge field effect to the edge photic zones 210 is weakened. However, the film thickness of each of the overlapped shading zones 190 should not be too small. Generally, a designed minimal film thickness is greater than one tenth of the film thickness of each of the main photic zones 200, so that the occurrence of a breaking problem of each of the overlapped shading zones 190 due to the fact that the film thickness of each of the overlapped shading zones 190 is too small is prevented.

In one or more embodiments, as shown in FIG. 9, the film thickness of each of the main photic zones 200 is equal to a film thickness of the common electrode.

In this solution, as mentioned above, the film thickness of each of the edge photic zones 210 is greater than the film thickness of each of the main photic zones 200. Nevertheless, it cannot be indicated that each of the edge photic zones 210 is certainly thicker than the designed film thickness. It is also possible that each of the main photic zones 200 is cut thin during the manufacture procedures and each of the edge photic zones 210 is also thicker than each of the main photic zones 200. Generally, the designed film thickness is a normal film thickness and it cannot be structurally seen that each of the main photic zones 200 is equal to the common electrode in the film thickness, where the common electrode is taken as a reference and its film thickness generally is about 1400 mm, thereby achieving the purpose of pure structural description. The film thickness of the specification of the pixel electrode of the display panel 110 may be set as D, the film thickness d3 of each of the main photic zones 200 is equal to the D, the film thickness d1 of each of the overlapped shading zones 190 is smaller than the D and the film thickness d2 of each of the edge photic zones 210 is greater than the D.

Figure 10:
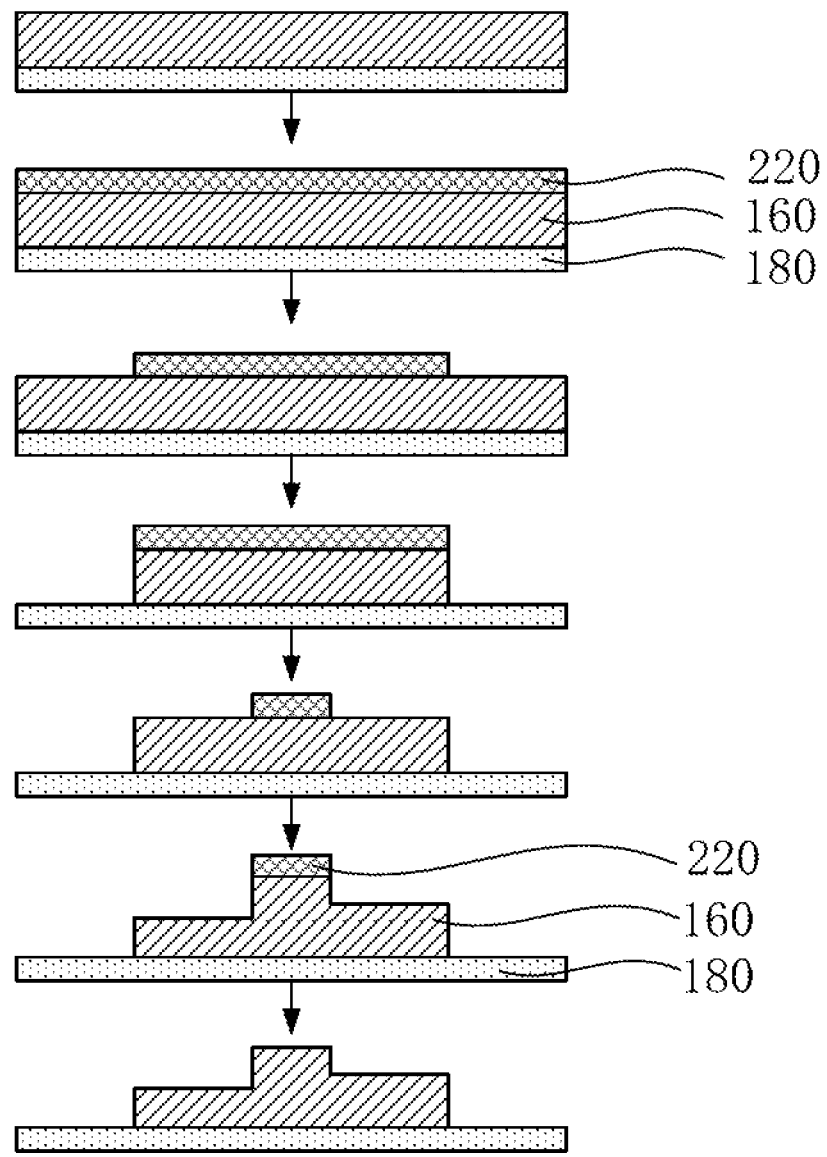
FIG. 10 is a schematic diagram of manufacture procedures according to an embodiment of the present application.

As another embodiment of the present application, referring to FIG. 9 and FIG. 10, the present application discloses a manufacturing method of a display panel 110, which includes a manufacturing method of a first substrate 120; and the manufacturing method of the first substrate 120 includes the following steps: deposit a metal layer on a base, and etch to obtain first common lines each with a preset pattern; form an insulating layer 180 on each of the first common lines, and deposit a pixel electrode material on the insulating layers (PVX), manufacture first electrodes 160; deposit a photoresist material on the pixel electrode material; form a photoresist layer 220 with a preset pattern by exposure and image developing; perform the exposure and the image developing once by using a semi-transparent film mask or perform the exposure and the image developing for multiple times by using a plurality of masks to treat the pixel electrode material to obtain the first electrodes of which a film thickness of each of edge photic zones 210 is greater than a film thickness of each of overlapped shading zones 190; and stripping the photoresist layer 220.

In this solution, in the step of etching the pixel electrode material by using the semi-transparent mask to obtain the first electrodes of which the film thickness of each of the edge photic zones 210 is greater than the film thickness of each of the overlapped shading zones 190, the first electrodes of which the film thickness of each of the edge photic zones 210 is greater than the film thickness of each of the overlapped shading zones 190 may be directly formed by the semi-transparent mask. It may also be appropriate to etch a pixel electrode into a predetermined cross-sectional shape via a common mask first and then further etch portions corresponding to the main photic zones 200 via a semi-transparent film, so that the film thickness of each of the main photic zones 200 reaches to the film thickness required by a specification, and the film thickness of each of the edge photic zones 210 is greater than the film thickness of the specification.

Where, if there is a further need to manufacture an area of which the film thickness is different from each of the main photic zones 200 and each of the edge photic zones 210 on each of the first electrodes, other mask may be for replacement. If the manufacture procedures are complex, it may also be appropriate to form the first electrodes having at least three film thicknesses once by using a special semi-transparent film mask. However, the semi-transparent film mask is highly demanding.

Figure 11:
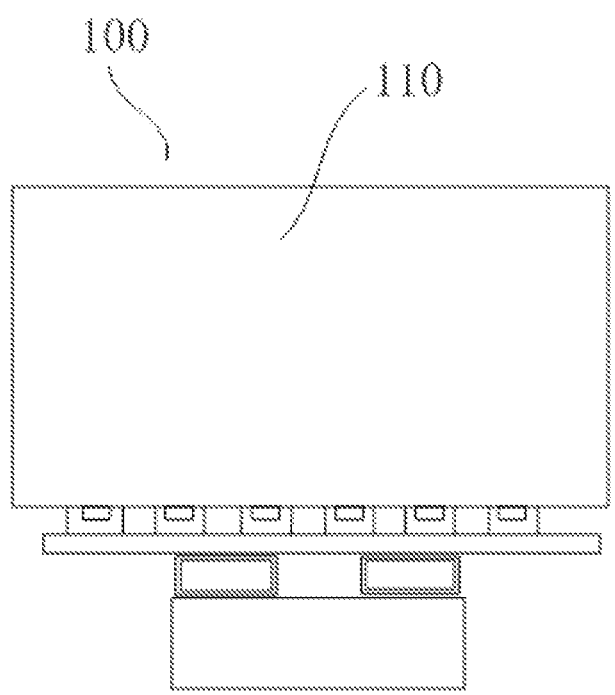
FIG. 11 is a schematic diagram of a display apparatus according to an embodiment of the present application.

As another embodiment of the present application, referring to FIG. 11, the present application discloses a display apparatus 100, which includes the above-mentioned display panel 110.

It is to be noted that, a limit on each step related in this solution is not considered as a limit to a sequential order of the steps on the premise of not affecting implementation of a specific solution. A step written in front may be executed ahead and may also be executed later, or even may also be executed simultaneously; and as long as this solution can be implemented, all should be considered as a scope of protection of the present application.

The above are further detailed descriptions of the present application in combination with specific optional implementation manners and should not be deemed as that the specific implementation of the present application is only limited to these descriptions. A person of ordinary skill in the art to which the present application belongs may further make a plurality of simple deviations or replacements without departing from the concept of the present application and all should be considered as the scope of protection of the present application.

What is claimed is:

1. A display panel, comprising:
a first substrate; and
a second substrate, disposed in a cell aligned manner with the first substrate, wherein
first common lines and first electrodes are disposed on the first substrate;
each of the first electrodes is partially overlapped with each of the first common lines:
a common electrode is disposed on the second substrate, and the common electrode corresponding to the first common lines and the first electrodes;
each of portions where the first electrodes and the first common lines are overlapped is an overlapped shading zone; each of portions where the first electrodes and the first common lines are not overlapped is a photic zone; each of the photic zones comprises:
a main photic zone; and
an edge photic zone, disposed between each of the main photic zones and each of the overlapped shading zones and close to each of the overlapped shading zones; and
a film thickness of each of the edge photic zones is greater than a film thickness of each of the overlapped shading zones.

2. The display panel according to claim 1, wherein the film thickness of each of the edge photic zones is greater than a film thickness of each of the main photic zones.

3. The display panel according to claim 2, wherein the film thickness of the each of the main photic zones is equal to the film thickness of each of the overlapped shading zones.

4. The display panel according to claim 2, wherein the film thickness of each of the main photic zones is greater than the film thickness of each of the overlapped shading zones.

5. The display panel according to claim 4, wherein the film thickness of each of the edge photic zones is not greater than ten times of the film thickness of each of the main photic zones.

6. The display panel according to claim 5, wherein a width of each of the edge photic zones is greater than 0.01 times of a width of each of the first electrodes, and is smaller than a half of the width of each of the first electrodes.

7. The display panel according to claim 6, wherein the width of each of the edge photic zones is equal to one third of the width of each of the first electrodes.

8. The display panel according to claim 4, wherein the film thickness of each of the overlapped shading zones is greater than one tenth of the film thickness of each of the main photic zones.

9. The display panel according to claim 2, wherein the film thickness of each of the main photic zones on the first substrate is equal to a film thickness of the common electrode on the second substrate.

10. A manufacturing method of a display panel, the manufacturing method comprising a manufacturing method of a first substrate, and the manufacturing method of the first substrate comprising the following steps:
   depositing a metal layer on a base, and etching to obtain first common lines each with a preset pattern;
   forming an insulating layer on the first common lines, and depositing a pixel electrode material on the insulating layers;
   depositing a photoresist material on the pixel electrode material;
   forming a photoresist layer with a preset pattern by exposure and image developing;
   performing the exposure and the image developing once by using a semi-transparent film mask or performing the exposure and the image developing for multiple times by using a plurality of masks to treat the pixel electrode material to obtain first electrodes of which a film thickness of each of an edge photic zones is greater than a film thickness of each of overlapped shading zones; and
   stripping the photoresist layer.

11. A display apparatus, comprising a display panel, and the display panel comprising:
   a first substrate; and
   a second substrate, disposed in a cell aligned manner with the first substrate, wherein
   first common lines and first electrodes are disposed on the first substrate;
   each of the first electrodes is partially overlapped with each of the first common lines:
   a common electrode corresponding to the first common lines and the first electrodes is disposed on the second substrate;
   each of portions where the first electrodes and the first common lines are overlapped is an overlapped shading zone; each of portions where the first electrodes and the first common lines are not overlapped is a photic zone; each of the photic zones comprises:
   a main photic zone; and
   an edge photic zone, disposed between each of the main photic zones and each of the overlapped shading zones and close to each of the overlapped shading zones; and
   a film thickness of each of the edge photic zones is greater than a film thickness of each of the overlapped shading zones.

12. The display apparatus according to claim 11, wherein the film thickness of each of the edge photic zones is greater than a film thickness of each of the main photic zones.

13. The display apparatus according to claim 12, wherein the film thickness of the each of the main photic zones is equal to the film thickness of each of the overlapped shading zones.

14. The display apparatus according to claim 12, wherein the film thickness of the each of the main photic zones is greater than the film thickness of each of the overlapped shading zones.

15. The display apparatus according to claim 14, wherein the film thickness of each of the edge photic zones is not greater than ten times of the film thickness of each of the main photic zones.

16. The display apparatus according to claim 15, wherein a width of each of the edge photic zones is greater than 0.01 times of a width of each of the first electrodes, and is smaller than a half of the width of each of the first electrodes.

17. The display apparatus according to claim 16, wherein the width of each of the edge photic zones is equal to one third of the width of each of the first electrodes.

18. The display apparatus according to claim 14, wherein the film thickness of each of the overlapped shading zones is greater than one tenth of the film thickness of each of the main photic zones.

19. The display apparatus according to claim 12, wherein the film thickness of each of the main photic zones on the first substrate is equal to a film thickness of the common electrode on the second substrate.

* * * * *